Sept. 29, 1953  B. P. ADAMS  2,653,565
DIAL-TYPE SCALE

Filed March 18, 1949  3 Sheets-Sheet 1

Inventor
Bruce P. Adams
By the Firm of Charles W. Hill, Attys

Sept. 29, 1953  B. P. ADAMS  2,653,565
DIAL-TYPE SCALE
Filed March 18, 1949  3 Sheets-Sheet 2
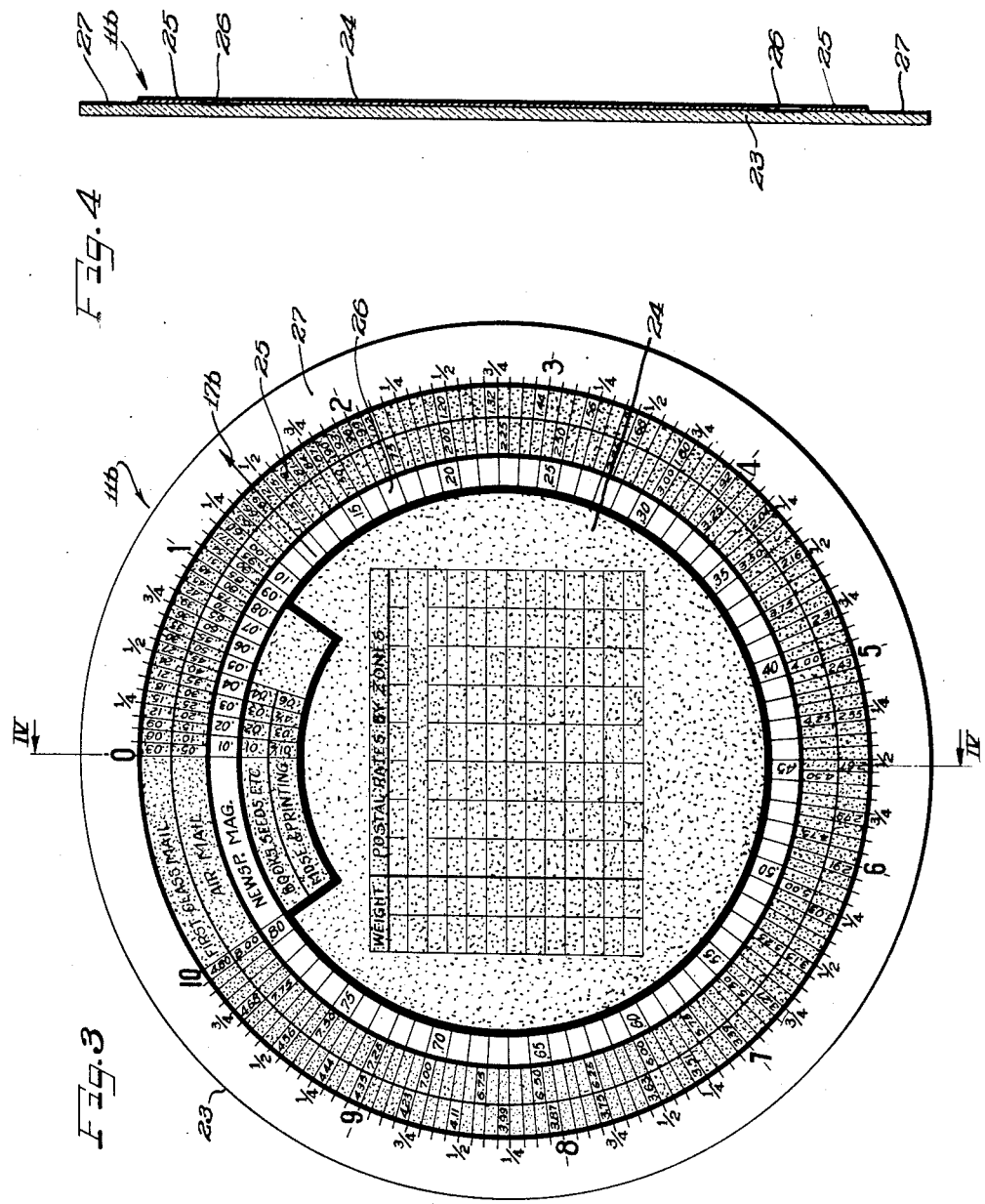
Inventor
Bruce P. Adams
By The Firm of Charles W. Hill Attys Sept. 29, 1953    B. P. ADAMS    2,653,565
DIAL-TYPE SCALE
Filed March 18, 1949    3 Sheets-Sheet 3
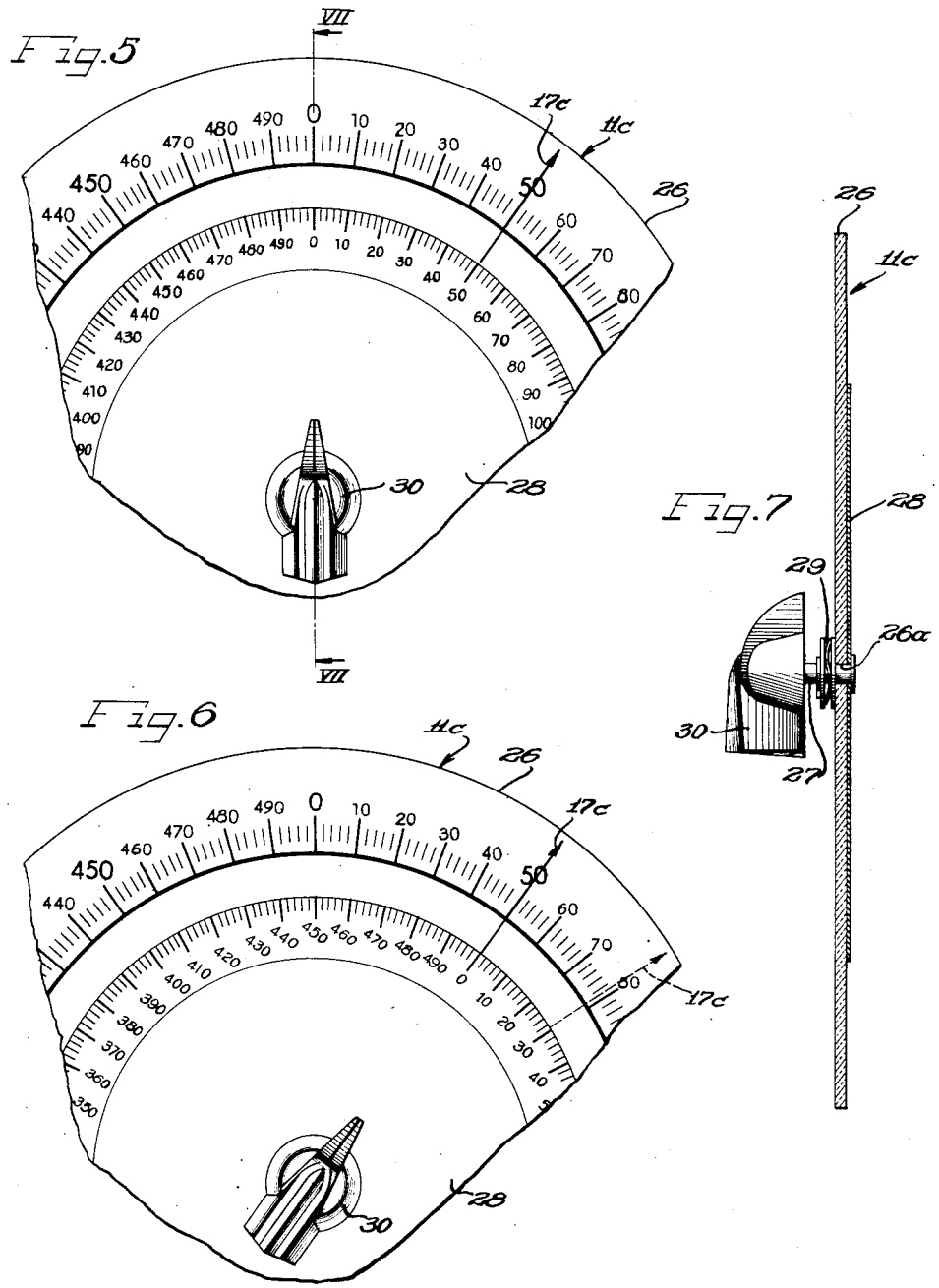

UNITED STATES PATENT OFFICE 2,653,565

DIAL-TYPE SCALE

Bruce P. Adams, Wilmette, Ill., assignor to Pelouze Manufacturing Co., Evanston, Ill., a corporation of Illinois Application March 18, 1949, Serial No. 82,249

6 Claims. (Cl. 116—133)

This invention relates to dial-type scales, and more particularly to removable dials used in connection with weighing devices such as parcel post scales, dietetic scales, and the like.

It is well known that certain types of weighing devices are provided with a dial-type scale having a face conveniently marked for rapid computation of various cost charges which progressively increase in proportion to the quantitative value of weight of the article being weighed. However, in the dial type scales heretofore provided, certain deficiencies have been present inasmuch as the face of the dial must necessarily indicate a plurality of indicia scales which may include quantitative weight values as well as quantitative monetary charges. Thus, when the dial pointer of a typical scale is actuated over the face of a conventional dial-type scale, there is a marked prevalency of inaccuracy due to the fact that the weighing device operator must first refer to the quantitative weight value and then must refer to a corresponding monetary charge scale remote from the reference dial pointer.

A dial-type scale constructed in accordance with the teaching of the present invention provides a dial body which defines a circular configuration and is made of a transparent material. The dial body has associated therewith a circle of opaque material which is of smaller diameter than the body and which is centrally disposed thereon. An annulus of opaque material or an annular scale comprising a circle of opaque markings is provided on the dial body, or associated therewith, so as to lie in spaced concentric relation to the circle of opaque material.

With this construction, the operator of the weighing device is presented with a dial face characterized by one or more clear and transparent annular rings which lie in spaced concentric relationship with respect to the circle of opaque material and the annulus of opaque material or annular scale. When the dial pointer of the weighing device moves over the face of such a dial-type scale, it will be apparent that the pointer may be referred to not only at the outer periphery of the dial body but also at the points in proximity to the clear and transparent annular ring portion.

It has been found that a dial-type scale constructed in accordance with the teaching of the present invention affords inexperienced operators great facility in making an accurate determination of monetary charge rates dependent upon quantitative weight values. This is particularly true if the annular ring of opaque material is calibrated in the form of a plurality of scales, and it is necessary to use the weighing device for a number of varied purposes. Therefore, it is an object of this invention to provide a dial-type scale having the aforementioned characteristics and upon which a plurality of calibrated scale indicia may be inscribed for convenient and ready reference in connection with a suitable dial pointer which may be moved across the face of the dial-type scale in response to motivation of a weighing device.

Dial scales have also been provided for weighing devices which find a special application as, for example, in dietetic work. Nutrition experts formulating a planned diet frequently are confronted with the necessity of cumulating a plurality of unit masses into an aggregate sum total. Accordingly, it is necessary to make an accurate determination of the quantitative weight value of each unit mass, and it is further necessary to have available an additive determination of a plurality of such unit masses when they are combined to form an aggregate mass.

A dial-type scale constructed in accordance with the teachings of the present invention provides a first dial body of generally circular configuration with a centrally disposed aperture extending therethrough. A circular member of opaque material is mounted on a rotatable shaft assembled with the first dial body and in juxtaposition thereto in such a manner as to be susceptible to rotative adjustment relative to the first dial body. An annulus of opaque material may be associated with or affixed to the dial body, so as to lie in predetermined spaced radial relation to the circular member of opaque material. Thus, various incremental unit masses may be placed on a weighing device and the cumulative quantitative weight value of the various increments will be indicated upon a suitable indicia scale inscribed upon the annulus of opaque material situated on the dial body.

As each increment of unit mass is prepared for subsequent addition to the aggregate mass, the circular body of opaque material having suitable indicia scales inscribed on the outer periphery thereof may be rotatably adjusted relative to the existing position of the dial pointer moving across the face of the dial body, thereby establishing a new zero point. It will be apparent that a weighing device provided with such a dial-type scale presents the operator with not only a ready reference to the cumulative weight value of the aggregate mass, but also a zero scale suitable for determining the quantitative weight value of the next increment unit mass to be added to the aggregate.

It is, therefore, another object of this invention to provide a dial-type scale assembly having the aforementioned characteristics which may be used to particular advantage in connection with a weighing device to be used under conditions necessitating the determination of quantitative weight values of incremental unit masses and a cumulative aggregative mass.

A further object of this invention is to provide a removable dial-type scale which may readily be replaced upon a weighing device.

Many other advantages and objects of the present invention will become manifest to those versed in the art through reference to the following detailed description and the accompanying drawings in which:

Figure 3 is a front elevational view of a dial-type scale assembly embodying the principles of my invention.

Figure 4 is a cross-sectional view of the dial-type scale shown in Figure 3, taken on line IV—IV of Figure 3.

Figure 5 is a fragmentary front elevational view of an adjustable dial-type scale embodying the principles of my invention.

Figure 6 is a fragmentary front elevational view similar to that shown in Figure 5 and illustrating the operation of my invention.

Figure 7 is a cross-sectional view taken on line VII—VII of Figure 5.

As shown on the drawings:

Figure 1:
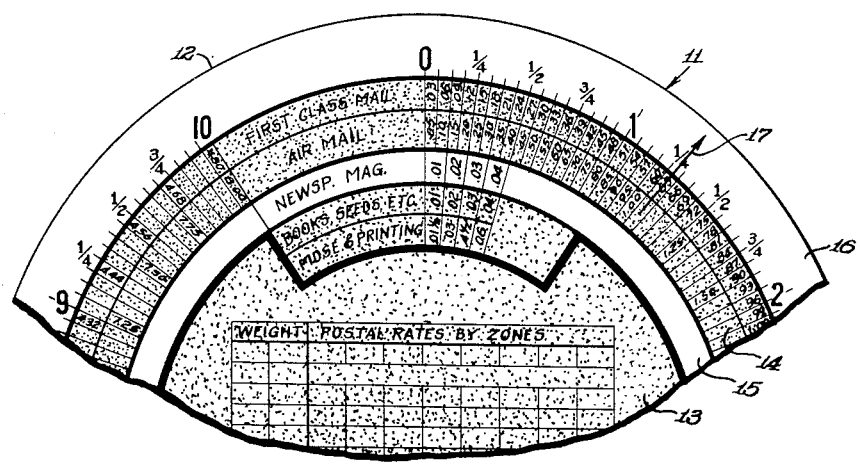
Figure 1 is a fragmentary view of a front elevation of a dial-type scale embodying the principles of my invention.

Referring to Figure 1, a dial-type scale is indicated generally by the reference numeral 11. The scale 11 includes a dial body 12 made of a transparent material such as plastic or glass which is shaped so as to define a circular configuration. A circle of opaque material 13 is placed on one face of the dial body 12. The circle 13 is preferably of substantially smaller diameter than the diameter of the body 12. An annulus of opaque material 14 is placed upon the face of the body 12 in such a manner as to be spaced outwardly from the circle 13 in predetermined spaced radial relation thereto.

The circle 13 may be inscribed with a suitable indicia scale along its outer periphery as shown on the drawings. The annulus 14 may likewise be suitably inscribed with one or more indicia scales which, by way of example, may take the form of the conventional monetary charge rate of the United States Post Office Department.

As may be seen on Figure 1, the dial body 12 provided with an inner circle 13 and a spaced annulus 14, is characterized by a pair of clear and transparent annular rings 15 and 16. Thus, when a pointer 17 moves across the face of the dial body 12 in response to actuation of a weighing device (not shown) associated with the dial-type scale 11, the pointer 17 may be clearly viewed through the annular ring 15 and the annular ring 16. It is, therefore, apparent that even though the face of the dial body 12 is provided with a plurality of reference indicia scales which appear respectively on the circle 13 and the inner and outer peripheries of the annulus 14, each indicia scale may be conveniently referred to in making an accurate determination of charge rates or other desired information because of the propinquity of the pointer 17 to the appropriate indicia scale.

It may be noted that the annular ring 15 and the annular ring 16 may also be provided with indicia scales through the utilization of opaque markings affixed to the dial body 12. Thus, additional indicia scales are provided without impairing the efficient determination of any one of a plurality of quantitative values determinable upon the weighing device.

Figure 2:
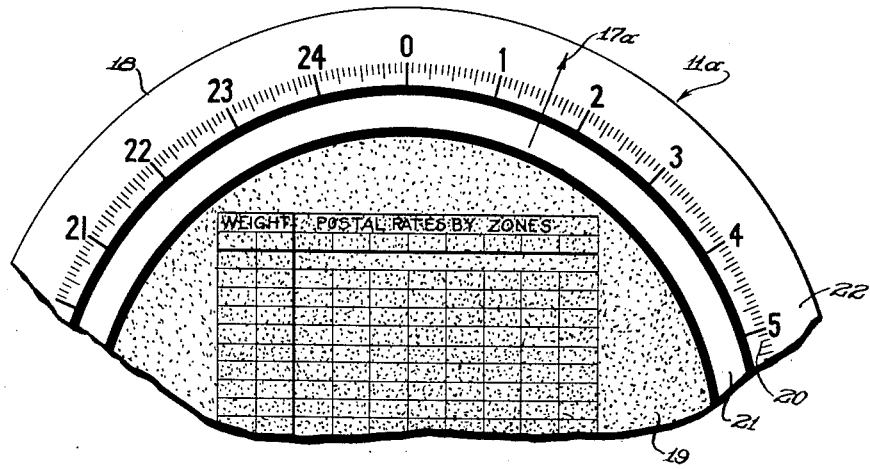
Figure 2 is a fragmentary front-elevational view of a dial-type scale which comprises a modification of the scale shown in Figure 1.

Referring now to Figure 2, the dial-type scale 11a is shown as comprising a body 18 made of clear transparent material such as glass or plastic of generally circular configuration and provided with an inner circle 19 of opaque material. The circle 19 is of substantially smaller diameter than the diameter of the body 18. A substantially annular circle of opaque marking 20 is arranged on the dial body 18 in such a manner as to lie in predetermined spaced radial alignment with the circle 19. Thus, as may be seen on Figure 2, the dial body 18 is provided with a pair of clear and transparent annular rings 21 and 22 which lie in spaced radial alignment relative to the opaque marking 20 and the circle 19. A pointer 17a moving across the face of the dial body 18 in response to actuation of a weighing device (not shown) associated with the dial-type scale 11a is therefore clearly visible in both the annular ring 21 and the annular ring 22. Because of the fact that the pointer 17a may be clearly seen in the annular ring, the pointer 17a establishes dual points of reference which greatly facilitates the accurate determination of the quantitative weight value to be determined upon the dial-type scale 11a.

Referring now to Figure 3, a dial-type scale 11b is shown as including a dial body 23 made of clear and transparent material such as plastic or glass and is formed of generally circular configuration. As may be seen on Figures 3 and 4, a circular shaped backing member 24 is provided which is of substantially smaller diameter than the diameter of the dial body 23. The circular backing member 24 may be placed in firm assembly with the dial body 23 by means of a suitable adhesive or other securing means. An annular backing member 25 is also provided which may be secured to the dial body 23 by an adhesive or other suitable fastening means. The annular backing member 25 is preferably of a smaller outer diameter than the outer diameter of the dial body 23, but of a larger inner diameter than the outer diameter of the circular backing member 24. Thus, it will be evident that a dial-type scale assembly of such construction will present the observer with a dial face defining a clear and transparent annular ring 26 and a clear and transparent annular portion 27.

The circular backing member 24 may be provided with an inscribed plurality of indicia scales around its periphery and the annular backing member 25 may likewise be provided with a plurality of inscribed indicia scales, as may be desired. It may further be desirable to provide the annular ring 26 and the annular portion 27 with suitable opaque markings so as to permit the use of additional indicia scales. Thus, when a pointer 17b moves across the face of the dial body 23 in response to actuation of a weighing device associated with the dial-type scale assembly 11b, ready reference may be had to any one of the plurality of indicia scales provided on the face of the dial-type scale 11b.

Referring now to Figures 5, 6 and 7, a dial-type scale assembly is indicated generally by the reference numeral 11c. The assembly 11c may include a circular body portion made of clear and transparent material such as plastic or glass 26 and which is formed to define a circular configuration. As may be most clearly seen on Figure 7, the dial body further defines a centrally disposed aperture as at 26a. The aperture 26a receives in rotatable assembly therewith a shaft pin 27. Firmly assembled to the shaft pin 27 is a circular member 28 of substantially smaller circular configuration than the dial body 26. The shaft pin 27 is provided with suitable retaining means 29 so as to maintain the circular member 28 and the dial body 26 in rotatably adjustable assembly on the shaft pin 27. The shaft pin 27 is further provided with a suitable knob 30 so as to facilitate manual rotation of the circular member 28 relative to the dial body 26.

A suitable indicia scale may be inscribed upon the outer periphery of the circular member 28 and an annular indicia scale comprising suitable opaque markings may be provided on one face of the dial body 26.

A weighing device equipped with a dial-type scale 11c would find particularly useful application under conditions where the operator desires to know a cumulative weight reading but also desires that weight values of subsequently added increments be readily available. Accordingly, the operation of the dial-type scale 11c will be explained in connection with such a situation.

As may be seen on Figure 5, a dial pointer 17c is shown resting in registry with the indicia numeral 50. Assuming, for the moment, that the dial-type scale 11c is being used in connection with a dietetic scale and that the indicia scale appearing on the circular member 28 and the dial body 26 refer to weight values in grams, the position of the pointer 17c may be said to represent the weight of a first increment being contributed to an aggregate total mass. It follows, therefore, that if a second increment is to be added to the total mass and the second increment must be of a predetermined weight value, the operator cannot know the relation between the aggregate sum total and the incremental mass unless the predetermined weight value of the second increment is added to the 50-gram weight value attributable to the first increment. Accordingly, the circular member 28 is rotatably adjusted by turning the knob 30 attached to the shaft pin 27 until the zero point of the indicia scale on the circular member 28 comes in registered alignment with the pointer 17c.

If the weight value of the second increment would be, for example, 29 grams, the operator could, by making reference to the indicia scale on the circular member 28, add 29 grams of the second increment material to the aggregate mass. At this point, of course, reference to the indicia scale on the dial body 26 would indicate that the weight value of the aggregate mass would be 79 grams. If the sum total of the aggregate mass comprised many more increments, this procedure of operation could be repeated as oftentimes as would be necessary.

It will be evident from the foregoing description that I have described a novel and improved dial-type scale assembly which is readily adaptable to a wide variety of applications in the weighing device art. Although I have resorted to details in this description for the sake of clarity, it will be understood, of course, that I do not wish to be limited thereto but rather I wish to be limited only by the scope of the appended claims and the prior art.

I claim as my invention:

1. In a weighing scale, a dial assembly comprising a dial body having a circular configuration and being made of transparent material, a disk of opaque material of smaller diameter than said body and centrally disposed thereon, and an annulus of opaque material on said body in predetermined space concentric relation to said disk, the inner diameter of said annulus being larger than the outer diameter of said disk and the outer diameter of said annulus being smaller than the outer diameter of said body, whereby the face of said dial body is provided with a pair of clear and transparent annular rings in spaced concentric relationship on said body, said disk and said annulus having indicia scales marked on the outer peripheries thereof, and a pointer underlying said dial body and appearing through said pair of rings directly adjacent each of said indicia scales.

2. A dial assembly for a scale comprising, in combination, a transparent dial body having a generally circular configuration, an opaque backing member of generally circular configuration, said backing member being of substantially smaller diameter than said dial body, and an opaque annular backing member, said annular backing member having its inside diameter larger than the outside diameter of said circular backing member and its outside diameter smaller than the outside diameter of said dial body, said circular backing member and said annular backing member being firmly assembled to said dial body in such a manner as to provide a pair of clear transparent annular rings in spaced radial relationship on said body, said backing member and said annular backing member having indicia scales marked on the outer peripheries thereof, and a pointer underlying said dial body and appearing through said annular ring directly adjacent each of said indicia scales.

3. An adjustable scale type dial assembly suitable for use on a weighing scale comprising, in combination, a transparent dial body of generally circular configuration, said body defining a centrally disposed aperture, a shaft adapted to be rotatably received in said aperture, a second dial body of generally circular configuration, said second dial body being of smaller diameter than said first mentioned dial body, said second dial body being mounted for corotation with said shaft and in juxtaposition to said first mentioned dial body, retaining means on said shaft for holding said bodies in relative alignment and a knob means on the end of said shaft, whereby said first mentioned dial body may be employed for a cumulative indicia scale and said second dial body may be employed as an adjustable unit indicia scale relative to said first mentioned dial body.

4. An adjustable scale type dial assembly suitable for use on a weighing scale comprising, in combination, a transparent dial body of generally circular configuration, said body defining a centrally disposed aperture, a shaft adapted to be rotatably received in said aperture, a second dial body of generally circular configuration, said second dial body being of smaller diameter than said first mentioned dial body, said second dial body being mounted for corotation with said shaft and in juxtaposition to said first mentioned dial body, retaining means on said shaft for holding said bodies in relative alignment and a knob means on the end of said shaft, said first mentioned dial body further including a scale on one face of said body, said scale comprising a substantially annular circle of opaque markings arranged on said face in spaced radial alignment with said second dial body, whereby said scale may be employed for a cumulative indicia scale and said second dial body may be employed as an adjustable unit indicia scale relative to said first mentioned dial body.

5. An adjustable scale type dial assembly suitable for use on a weighing scale comprising, in combination, a transparent dial body of generally circular configuration, said body defining a centrally disposed aperture, a shaft adapted to be rotatably received in said aperture, a second dial body of generally circular configuration, said second dial body being of smaller diameter than said first mentioned dial body, said second dial body being mounted for corotation with said shaft and in juxtaposition to said first mentioned dial body, retaining means on said shaft for holding said bodies in relative alignment, and an annular backing member affixed to said first mentioned dial body, said member arranged on said body in spaced radial alignment with said second dial body whereby said annular member may be employed for a cumulative indicia scale and said second dial body may be employed as an adjustable unit indicia scale relative to said first mentioned dial body.

6. A dial assembly for a scale comprising, in combination, a transparent dial body defining a generally circular configuration, an opaque backing member of generally circular outer configuration, said backing member being of substantially smaller diameter than said dial body, and an opaque annular backing member, said annular backing member having its inside diameter larger than the outside diameter of said circular backing member and its outside diameter smaller than the outside diameter of said dial body, said circular backing member and said annular backing member being firmly assembled to said dial body in such a manner as to provide a pair of clear transparent annular rings in spaced radial relationship on said body, said dial body having opaque markings thereon forming an indicia scale appearing at each of said pair of clear and transparent annular rings, and a pointer underlying said body and extending radially transversely of both of said annular clear rings and appearing therethrough.

BRUCE P. ADAMS.

References Cited in the file of this patent

UNITED STATES PATENTS

| Number | Name | Date |
|---|---|---|
| 956,682 | Cochran | May 3, 1910 |
| 1,413,214 | Bassett | Apr. 18, 1922 |
| 1,667,540 | Dorsey | Apr. 24, 1928 |
| 1,755,106 | Eckardt | Apr. 15, 1930 |
| 2,108,342 | Le Fevre | Feb. 15, 1938 |